United States Patent
Murakami

(10) Patent No.: US 10,222,577 B2
(45) Date of Patent: Mar. 5, 2019

(54) LENS DRIVING DEVICE, CAMERA MODULE, AND CAMERA MOUNT DEVICE

(71) Applicant: Tomoyuki Murakami, Tokyo (JP)

(72) Inventor: Tomoyuki Murakami, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/539,395

(22) PCT Filed: Dec. 24, 2015

(86) PCT No.: PCT/JP2015/006426
§ 371 (c)(1),
(2) Date: Jun. 23, 2017

(87) PCT Pub. No.: WO2016/103700
PCT Pub. Date: Jun. 30, 2016

(65) Prior Publication Data
US 2017/0371127 A1    Dec. 28, 2017

(30) Foreign Application Priority Data
Dec. 26, 2014  (JP) ................... 2014-265987

(51) Int. Cl.
*G02B 27/64*  (2006.01)
*G02B 7/04*  (2006.01)
(Continued)

(52) U.S. Cl.
CPC ............ *G02B 7/04* (2013.01); *G02B 7/02* (2013.01); *G02B 27/646* (2013.01); *H04N 5/225* (2013.01);
(Continued)

(58) Field of Classification Search
None
See application file for complete search history.

(56) References Cited

U.S. PATENT DOCUMENTS 9,568,705 B2 *  2/2017  Sekimoto .............. G02B 7/021
2010/0091120 A1  4/2010  Nagata et al.
(Continued)

FOREIGN PATENT DOCUMENTS

JP    2011-128594 A    6/2011
JP    2012-058361 A    3/2012
(Continued)

OTHER PUBLICATIONS

International Search Report from International Application No. PCT/JP2015/006426 dated Mar. 29, 2016.
(Continued)

*Primary Examiner* — Derek S Chapel
(74) *Attorney, Agent, or Firm* — Brundidge & Stanger, P.C.

(57) ABSTRACT

The lens driving device according to the present invention is provided with: an autofocus drive part for moving an autofocus movable part with respect to an autofocus fixed part in an optical axis direction and thereby automatically performing focusing; a shake correction drive part for correcting shake by causing a shake correction movable part to oscillate with respect to a shake correction fixed part in a plane orthogonal to the optical axis direction; and a sub-stopper part for restricting the distance that the autofocus movable part can move toward the image side in the optical axis direction to within an allowable range of displacement of a lens part, the sub-stopper part being interposed between the autofocus movable part and the shake correction fixed part.

7 Claims, 10 Drawing Sheets

(51) Int. Cl.
*G02B 7/02* (2006.01)
*H04N 5/225* (2006.01)
*H04N 5/232* (2006.01)

(52) U.S. Cl.
CPC ......... *H04N 5/232* (2013.01); *H04N 5/23264* (2013.01)

(56) References Cited

U.S. PATENT DOCUMENTS

| | | | |
|---|---|---|---|
| 2013/0050828 A1* | 2/2013 | Sato | G02B 27/64 359/557 |
| 2013/0088609 A1* | 4/2013 | Shimizu | H04N 5/2253 348/208.7 |
| 2013/0163974 A1 | 6/2013 | Takei et al. | |
| 2014/0049848 A1* | 2/2014 | Hsu | G02B 7/10 359/823 |
| 2014/0177056 A1 | 6/2014 | Hayashi et al. | |

FOREIGN PATENT DOCUMENTS

| | | |
|---|---|---|
| JP | 2012-177753 A | 9/2012 |
| JP | 2013-210550 A | 10/2013 |
| JP | 2014-126668 A | 7/2014 |

OTHER PUBLICATIONS

Extended European Search Report issued in EP 15872271.0 dated Jun. 1, 2018.

\* cited by examiner

LENS DRIVING DEVICE, CAMERA MODULE, AND CAMERA MOUNT DEVICE

TECHNICAL FIELD

The present invention relates to an auto-focusing and shake-correcting lens driving device, a camera module having an auto-focusing function and a shake-correcting function, and a camera mounting device.

BACKGROUND ART

In general, a small-sized camera module is mounted in a mobile terminal such as a smartphone. In such a camera module, a lens driving device is employed (for example, PTLS 1 and 2). The lens driving device has an auto focus function of automatically performing focusing for capturing a subject (hereinafter referred to as "AF (Auto Focus) function"), and a shake correction function (hereinafter referred to as "OIS (Optical Image Stabilization) function") of optically correcting shake (vibration) upon capturing an image to reduce the irregularities of the image.

The auto-focusing and shake-correcting lens driving device includes an auto-focusing driving part (hereinafter referred to as "AF driving part") for moving the lens part in the light axis direction, and a shake-correcting driving part (hereinafter referred to as "OIS driving part") for swaying the lens part in a plane orthogonal to the light axis direction.

The AF driving part includes, for example, an auto-focusing coil part (hereinafter referred to as "AF coil part") disposed around the lens part, and an auto-focusing magnet part (hereinafter referred to as "AF magnet part") disposed separately from the AF coil part in the radial direction. An auto-focusing movable part (hereinafter referred to as "AF movable part") including the lens part and the AF coil part is moved with respect to an auto-focusing fixing part (hereinafter referred to as "AF fixing part") including the AF magnet part in the light axis direction by use of a driving force of a voice coil motor composed of the AF coil part and the AF magnet part, and thus focusing is automatically performed.

Here, a lens position for bringing a subject at a smallest capture distance (a position on the most light reception side) into focus is called "macro position," and a lens position for bringing a subject at the infinity (a position on the most imaging side) into focus is called "infinity position." That is, the range from the macro position to the infinity position is the movable range of the AF movable part.

The OIS driving part includes a shake-correcting magnet part (hereinafter referred to as "OIS magnet part") disposed at the AF driving part, and a shake-correcting coil part (hereinafter referred to as "OIS coil part") disposed separately from the OIS magnet part in the light axis direction, for example. A shake-correcting movable part (hereinafter referred to as "OIS movable part") including the AF driving part and the OIS magnet part is supported by a supporting member so as to be separated from a shake-correcting fixing part (hereinafter referred to as "OIS fixing part") including the OIS coil part in the light axis direction. The OIS movable part is swayed in a plane orthogonal to the light axis direction by use of a driving force of a voice coil motor composed of the OIS magnet part and the OIS coil part, and thus shake correction is performed.

FIGS. 1A and 1B illustrate a displacement width of a lens part in a conventional lens driving device. FIG. 1A illustrates a neutral (non-energization) state, and FIG. 1B illustrates a state at the time of dropping. In FIGS. 1A and 1B, the OIS magnet part serves also as the AF magnet part.

In the lens driving device illustrated in FIGS. 1A and 1B, AF movable part 11 where a lens part is disposed includes lens holder 111 and AF coil part 112, and AF fixing part 12 includes magnet holder 121 and magnet part 122 (AF magnet part). In addition, OIS movable part 10 includes an AF driving part (AF movable part 11 and AF fixing part 12), and is supported in a state where it is separated from OIS fixing part 20 including an OIS coil part (not illustrated) on the light reception side in the light axis direction.

In FIGS. 1A and 1B, AF movable part 11 moves to the imaging side or the light reception side in the light axis direction to perform focusing. AF movable part 11 can move to the imaging side in the light axis direction by L1 (hereinafter referred to as "lower movable range L1"). In addition, OIS movable part 10 is separated from OIS fixing part 20 by L2 (hereinafter referred to as "magnet gap L2") for swaying in a plane orthogonal to the light axis direction.

Accordingly, when an impact of dropping or the like is applied to the lens part, the lens part is displaced by up to a movable distance (L1+L2) of AF movable part 11 to the imaging side in the light axis direction. When the distance L3 between the lens part and the image capturing part is greater than the maximum displacement (L1+L2) of the lens part, collision with the image capturing part is not caused even when the lens part is displaced to the imaging side in the light axis direction by an impact of dropping or the like.

CITATION LIST

Patent Literature

PTL 1
Japanese Patent Application Laid-Open No. 2013-210550
PTL 2
Japanese Patent Application Laid-Open No. 2012-177753

SUMMARY OF INVENTION

Technical Problem

Incidentally, lower movable range L1 of AF movable part 11 and magnet gap L2 are designed such that a performance required for the lens driving device is achieved. For example, in the case where the attaching tolerance is ±65 μm, and 85 μm is guaranteed as the movable range of AF movable part 11 to the imaging side in the light axis direction, the design value of L1 is set to 150 μm. In addition, in the case where the attaching tolerance is ±40 μm, and a distance of 50 μm is guaranteed, the design value of L2 is set to 90 μm. In this case, considering the tolerance (root-mean-square (RMS)), the displacement width of the lens part is 240±76 μm.

Accordingly, it suffices to set distance L3 between the lens part and the image capturing part to 316 μm or greater. However, there is a strong demand of reducing the height of camera modules, and distance L3 between the lens part and the image capturing part is often limited. In particular, in the case where the lens number of the lens part is increased along with the increase in pixel count, and the height of the lens barrel is increased, the distance between the lens part and the image capturing part is reduced for maintaining the module height.

For example, in the case where the acceptable displacement range of the lens part is limited to 265 μm (distance L3−α between the lens part and the image capturing part), the above-described design cannot surely meet the demand. Therefore, as illustrated in FIG. 1B, when an impact of dropping or the like is applied, collision between the lens part and the image capturing part may possibly occur, and an IR filter provided on the surface of the imaging device may possibly be damaged. That is, the reliability is insufficient. In view of this, it is difficult to meet the demand in consideration of the attaching tolerance without preventing height reduction.

An object of the present invention is to provide a lens driving device, and a camera module and a camera mounting device including the lens driving device which can improve the reliability without preventing height reduction.

Solution to Problem

A lens driving device according to an embodiment of the present invention includes: an auto-focusing driving part including an auto-focusing coil part disposed at a periphery of a lens part, and an auto-focusing magnet part disposed separately from the auto-focusing coil part in a radial direction, the auto-focusing driving part being configured to perform automatic focusing by moving, with respect to an auto focus fixing part including the auto-focusing magnet part, an auto focus movable part including the auto-focusing coil part in a light axis direction by use of a driving force of a voice coil motor composed of the auto-focusing coil part and the auto-focusing magnet part; a shake-correcting driving part including a shake-correcting magnet part disposed in the auto-focusing driving part, and a shake-correcting coil part disposed separately from the shake-correcting magnet part in the light axis direction, the shake-correcting driving part being configured to perform shake correction by swaying, with respect to a shake correction fixing part including the shake-correcting coil part, a shake correction movable part including the shake-correcting magnet part in a plane orthogonal to the light axis direction by use of a driving force of a voice coil motor composed of the shake-correcting coil part and the shake-correcting magnet part; and a sub stopper part interposed between the auto focus movable part and the shake correction fixing part, and configured to limit a movable distance of the auto focus movable part to an imaging side in the light axis direction to a value within an acceptable displacement range of the lens part.

A camera module according to an embodiment of the present invention includes: the above-mentioned lens driving device; a lens part mounted in the auto focus movable part; and an image capturing part configured to capture a subject image imaged with the lens part.

A camera mounting device according to an embodiment of the present invention includes is an information apparatus or a transport apparatus, the camera mounting device including the above-mentioned camera module.

Advantageous Effects of Invention

According to the present invention, it is possible to readily set the displacement of the lens part to a value within an acceptable displacement range without preventing height reduction. Accordingly, the reliability of the lens driving device is remarkably improved.

DESCRIPTION OF EMBODIMENT

Figure 1A:
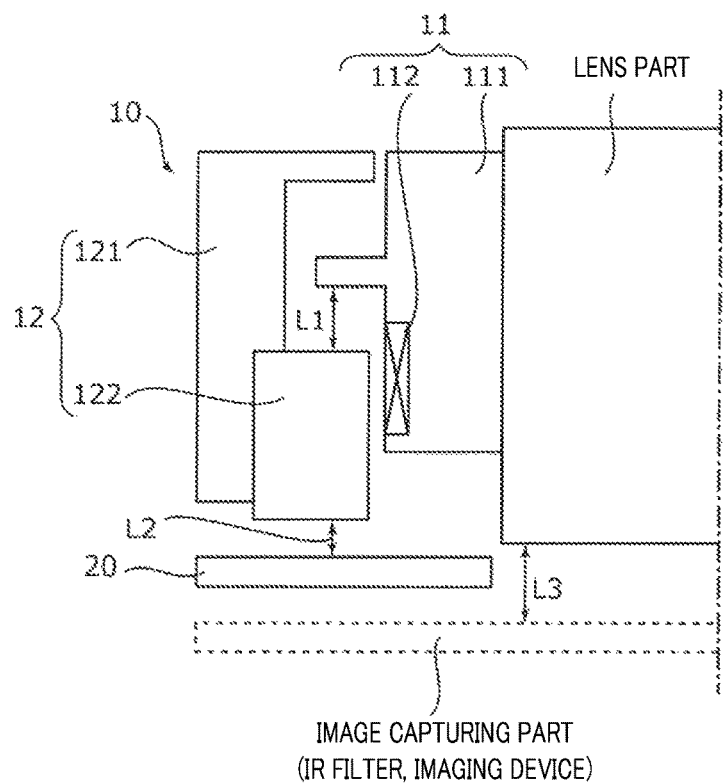
FIGS. 1A and 1B illustrate a displacement width of a lens part in a conventional lens driving device.
Figure 1B:
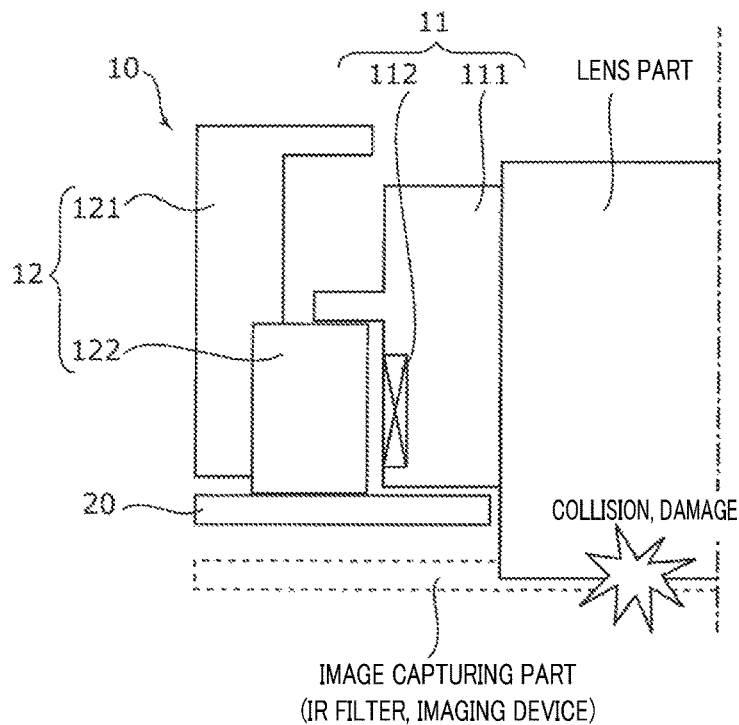
Figure 2A:
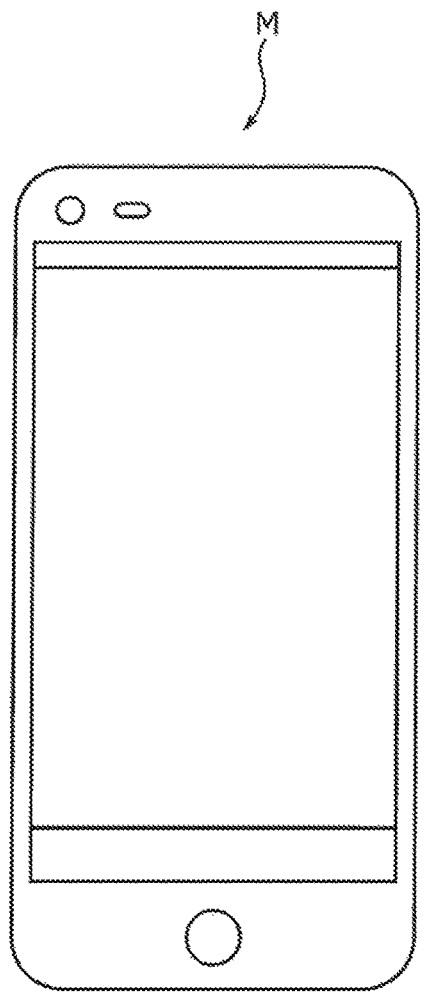
FIGS. 2A and 2B illustrate a smartphone in which a camera module according to an embodiment of the present invention is mounted.
Figure 2B:
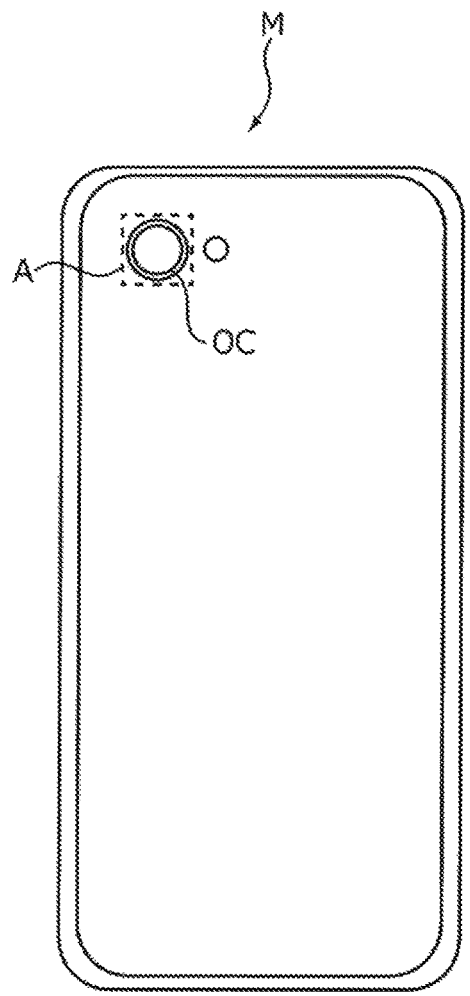

In the following, an embodiment of the present invention is described in detail with reference to the drawings. FIGS. 2A and 2B illustrate smartphone M in which camera module A according to the embodiment of the present invention is mounted. FIG. 2A is a front view of smartphone M, and FIG. 2B is a rear view of smartphone M.

For example, smartphone M is provided with camera module A as a back side camera OC. Camera module A has an auto-focusing function and a shake-correcting function, and can capture an image without image blurring by automatically performing focusing at the time of capturing a subject, and by optically correcting shake (vibration) at the time of capturing an image.

Figure 3:
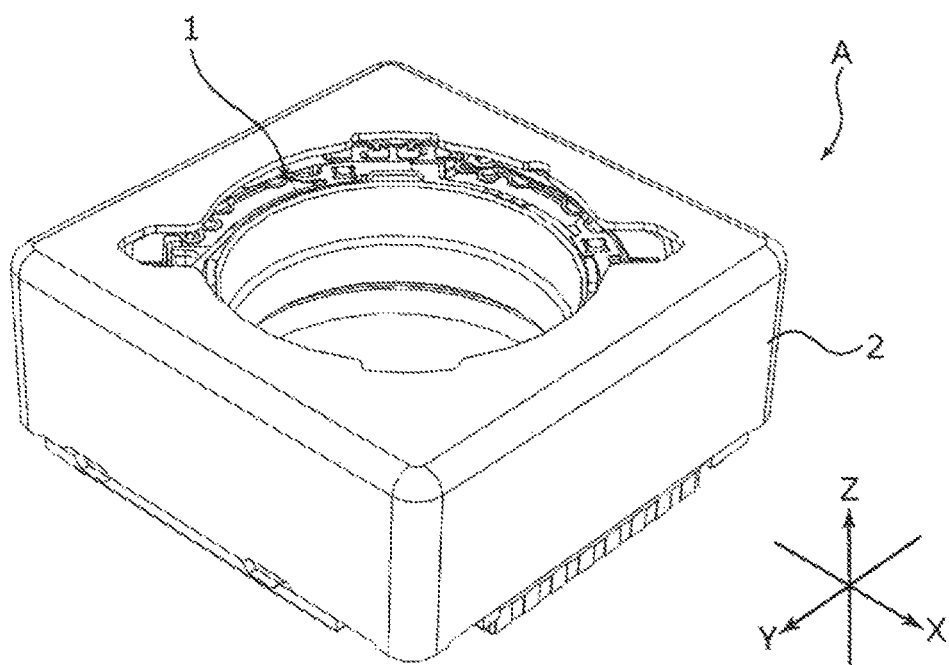
FIG. 3 is a perspective view illustrating an external appearance of the camera module.
Figure 4:
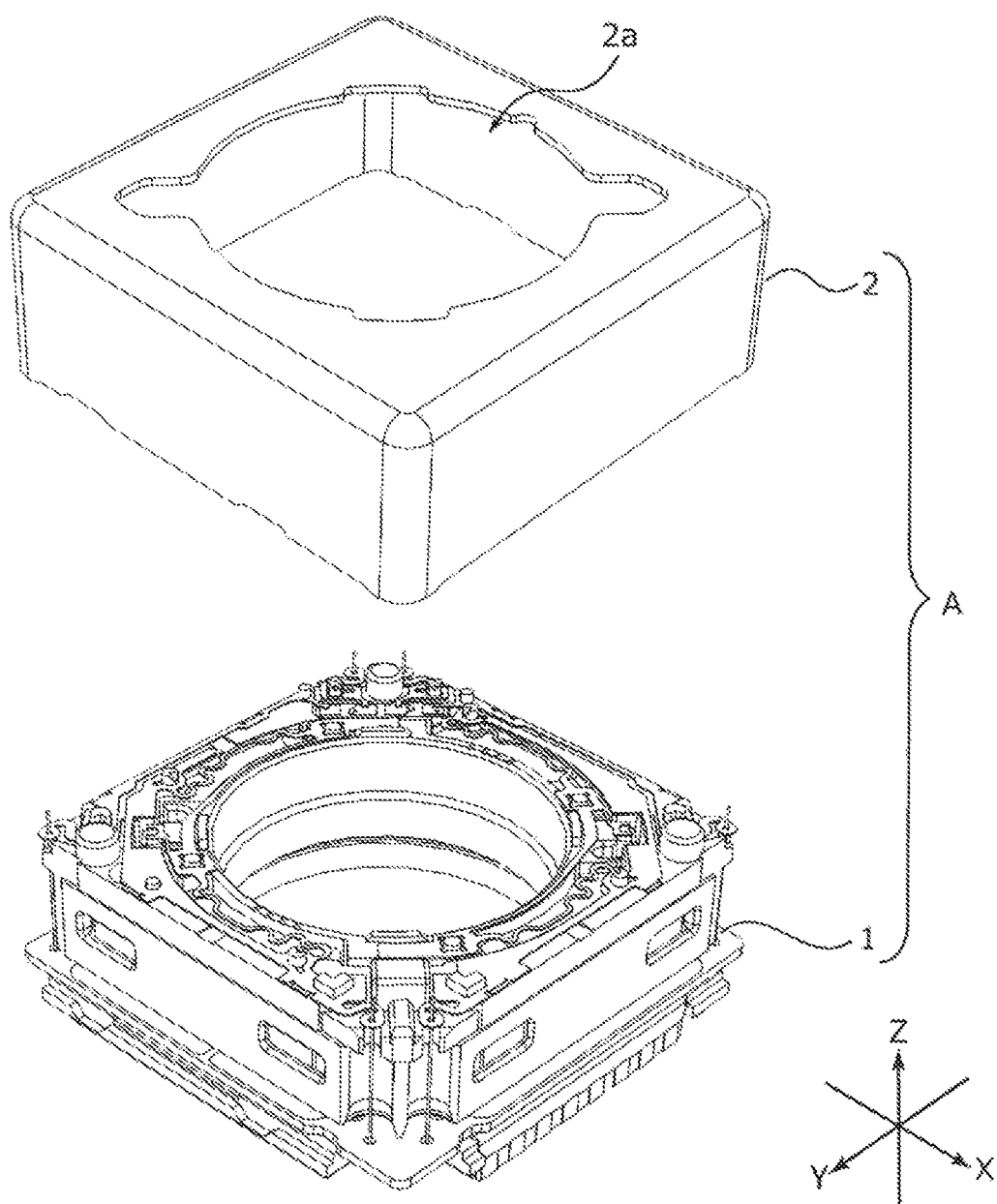
FIG. 4 is an exploded perspective view of the camera module.

FIG. 3 is a perspective view of an external appearance of camera module A. FIG. 4 is an exploded perspective view of camera module A. As illustrated in FIG. 3 and FIG. 4, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the imaging side in the light axis direction (also referred to as "infinity position side").

Camera module A includes a lens part (not illustrated) in which a lens is housed in a lens barrel having a cylindrical shape, AF and OIS lens driving device 1, an image capturing part (not illustrated) that captures a subject image imaged with the lens part, shield cover 2 that covers the entirety, and the like.

As viewed in the light axis direction, shield cover 2 is a capped square cylindrical body having a square shape in plan view. Circular opening 2a is formed in the top surface of shield cover 2. A lens part (not illustrated) is exposed to the outside through opening 2a. Shield cover 2 is fixed to base member 23 (see FIG. 7) of OIS fixing part 20 of lens driving device 1. Shield cover 2 has conductivity, and electrically connected with a ground terminal (not illustrated) of OIS fixing part 20, and is grounded.

The image capturing part (not illustrated) includes an imaging device (not illustrated), and is disposed on the imaging side in the light axis direction of the lens driving device 1. The imaging device (not illustrated) is composed of, for example, a CCD (charge coupled device) image sensor, a CMOS (complementary metal oxide semiconductor) image sensor, or the like. The imaging device (not illustrated) captures a subject image imaged by a lens part (not illustrated). An IR filter (not illustrated) is disposed on the light reception side in the light axis direction of imaging device (not illustrated).

Figure 5:
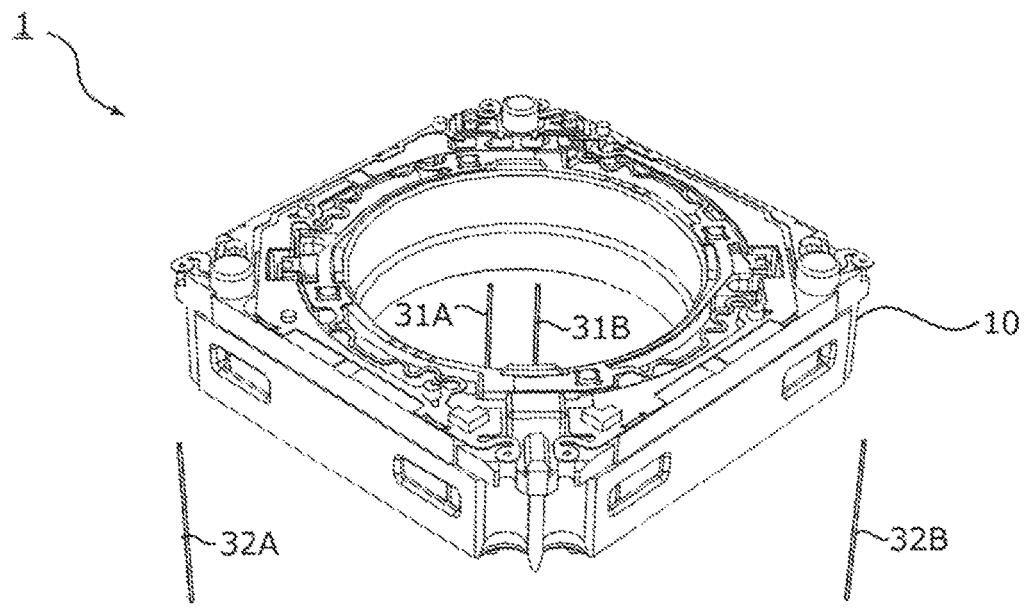
FIG. 5 is an exploded perspective view of a lens driving device.
Figure 5:
Figure 5:
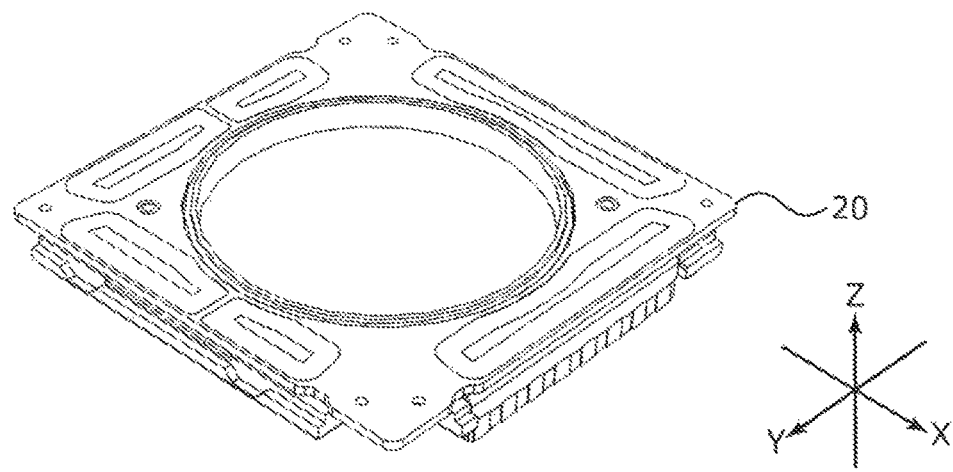

FIG. 5 is an exploded perspective view of lens driving device 1. As illustrated in FIG. 5, lens driving device 1 includes OIS movable part 10, OIS fixing part 20, supporting member 30 and the like.

OIS movable part 10 includes an OIS magnet part serving as a component of the OIS voice coil motor, and sways in the XY plane at the time of shake correction. OIS fixing part 20 includes an OIS coil part. That is, the OIS lens driving part of lens driving device 1 is of a moving magnet type. OIS movable part 10 includes an AF driving part (AF movable part 11 and AF fixing part 12, see FIG. 6).

OIS movable part 10 is disposed on the light reception side in the light axis direction relative to OIS fixing part 20 and is separated from OIS fixing part 20. OIS movable part 10 is coupled with OIS fixing part 20 by supporting member 30. To be more specific, supporting member 30 is composed of six suspension wires extending along the Z direction (hereinafter referred to as "suspension wire 30"). One end (upper end) of suspension wire 30 is fixed to OIS movable part 10 (upper elastic supporting part 13, see FIG. 6), and the other end (lower end) of suspension wire 30 is fixed to OIS fixing part 20 (coil substrate 21, see FIG. 7). OIS movable part 10 is supported by suspension wire 30 such that OIS movable part 10 can sway in the XY plane.

In the present embodiment, in six suspension wires 30, suspension wires 31A and 31B are used as a signal path of Hall device 161 (see FIG. 6) (signal suspension wire), suspension wires 32A and 32B are used as a power feeding path of Hall device 161 (Hall device feeding suspension wire), and suspension wires 33A and 33B are used as a power feeding path of AF coil part 112 (see FIG. 6) (coil feeding suspension wire). It is to be noted that the number of suspension wires 30 are not limited, and seven or more suspension wires 30 may be provided.

Figure 6:
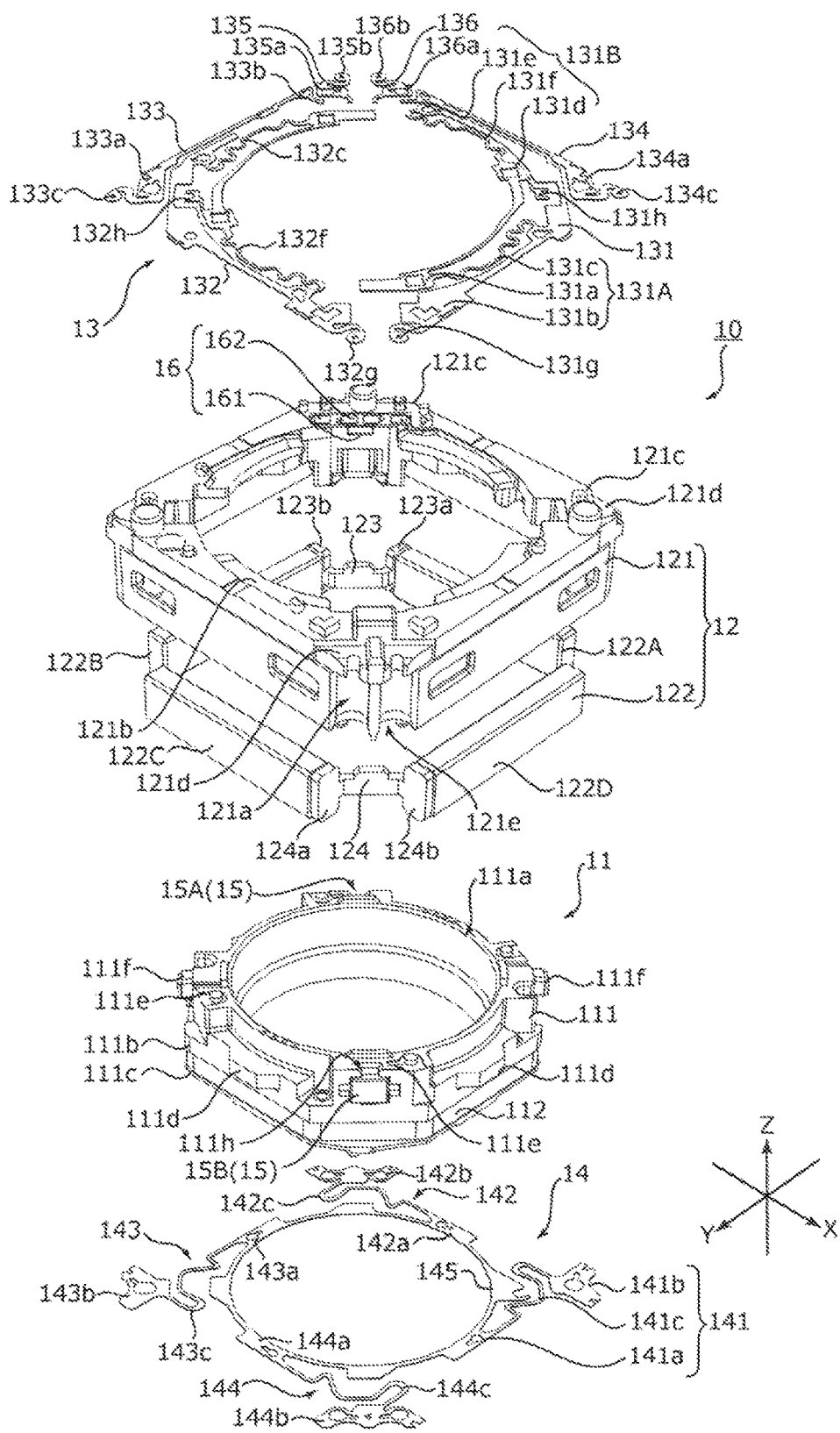
FIG. 6 is an exploded perspective view of an OIS movable part.

FIG. 6 is an exploded perspective view of OIS movable part 10. As illustrated in FIG. 6, OIS movable part 10 includes AF movable part 11, AF fixing part 12, upper elastic supporting part 13, lower elastic supporting part 14 and the like. AF movable part 11 includes an AF coil part serving as a component of an AF voice coil motor, and moves in the light axis direction at the time of focusing. AF fixing part 12 is a part having an AF magnet part. That is, the AF driving part of lens driving device 1 is of a moving coil type. AF movable part 11 is disposed on the radially inside relative to AF fixing part 12 and is separated from AF fixing part 12. AF movable part 11 is coupled with AF fixing part 12 by upper elastic supporting part 13 and lower elastic supporting part 14.

AF movable part 11 includes lens holder 111, AF coil part 112, and position detection magnet 15.

Lens holder 111 is a member having a cylindrical shape, and a lens part (not illustrated) is fixed to lens housing part 111a by bonding or screwing. Lens holder 111 includes upper flange part 111b and lower flange part 111c on the peripheral surface of lens housing part 111a. AF coil part 112 is wound at a part (hereinafter referred to as "coil winding part") sandwiched between upper flange part 111b and lower flange part 111c.

Lens holder 111 includes, at four portions that intersect the directions at 45° from the cross direction (hereinafter referred to as "diagonal direction") at an upper portion of the outer periphery of lens housing part 111a, upper spring fixing parts 111e that fix upper elastic supporting part 13. Lens holder 111 includes tying parts 111f that radially outwardly protrude from two diagonally-opposite upper spring fixing parts 111e of four upper spring fixing parts 111e. In addition, lens holder 111 includes, at four portions that intersect the X direction and the Y direction (hereinafter referred to as "cross direction") at the bottom surface, lower spring fixing parts 111g that fix lower elastic supporting part 14 (see FIG. 8).

Lens holder 111 includes, at four portions that intersect the cross direction at an upper portion of the outer periphery of lens housing part 111a, protruding parts 111d that radially outwardly overhang over upper flange part 111b and lower flange part 111c. The top surfaces of protruding parts 111d serve as locking parts for restricting the movement of AF movable part 11 to the light reception side in the light axis direction, and the bottom surfaces of protruding parts 111d serve as locking parts for restricting the movement of AF movable part 11 to the imaging side in the light axis direction.

Figure 8:
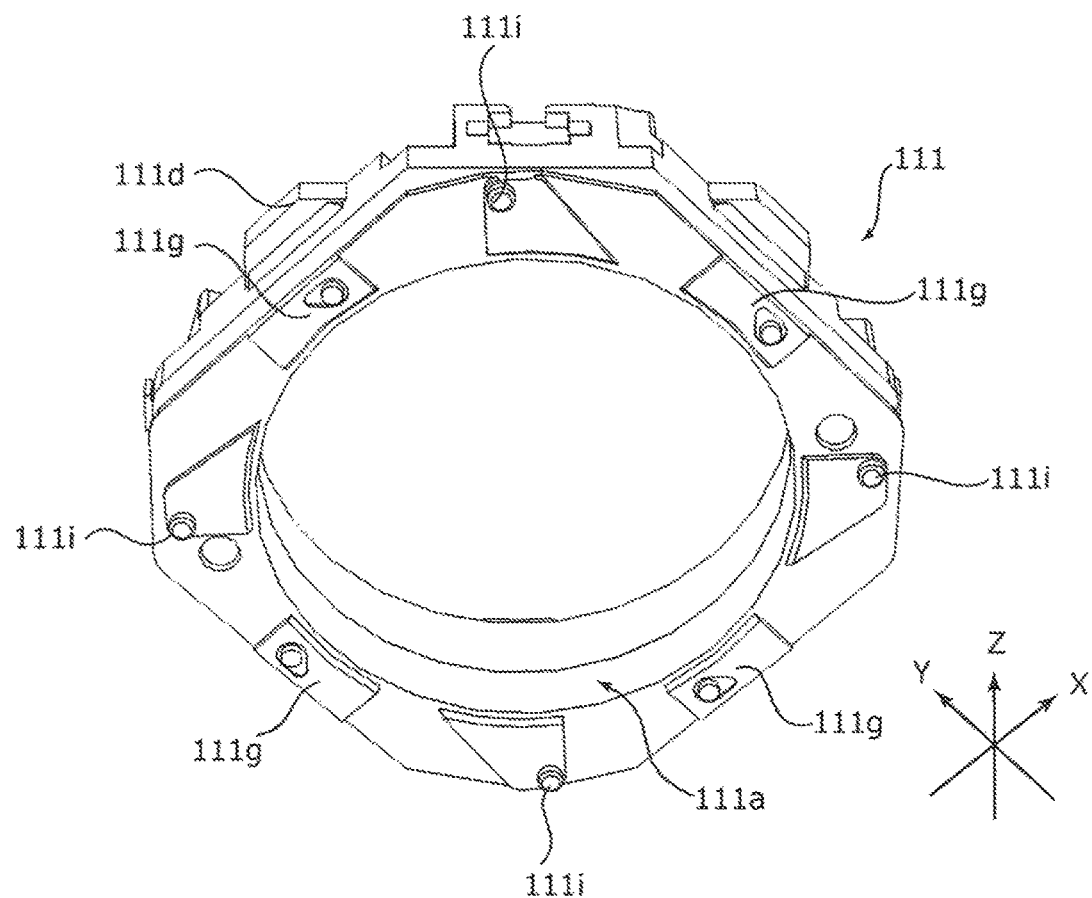
FIG. 8 is a lower perspective view of a lens holder.

Further, lens holder 111 includes, at four portions that intersect the diagonal direction at the bottom surface, protruding parts 111i that are higher than the positioning bosses provided at lower spring fixing part 111g and protrude toward the imaging side in the light axis direction (see FIG. 8). Protruding parts 111i are separated from lens housing part 111a as much as possible so as not to block the sway of OIS movable part 10. In addition, protruding parts 111i are evenly disposed around the light axis direction. Protruding part 111i functions as a sub stopper part (hereinafter referred to as "sub stopper part 111i") interposed between AF movable part 11 and OIS fixing part 20, which limits the movable distance of AF movable part 11 to the imaging side in the light axis direction to a value within the acceptable displacement range of the lens part.

AF coil part 112 is an air-core coil that is energized at the time of focusing, and is wound around the outer peripheral surface of a coil winding part of lens holder 111. The both ends of AF coil part 112 are tied to tying parts 111f of lens holder 111.

Position detection magnet 15 is disposed at magnet housing part 111h formed at upper spring fixing part 111e of lens holder 111. Detection magnet 15 that is disposed at a position on the side corresponding to position detection part 16 (hereinafter referred to as "first position detection magnet 15A") is practically used for position detection of AF movable part 11. The other position detection magnet 15 (hereinafter referred to as "second position detection magnet 15B") is a dummy magnet that is not used for the position detection of AF movable part 11. Second position detection magnet 15B is disposed for balancing a magnetic force which acts on AF movable part 11 and stabilizing the orientation of AF movable part 11. Specifically, when second position detection magnet 15B is not disposed, a one-sided magnetic force is exerted on AF movable part 11 due to the magnetic field generated at magnet part 122, and the orientation of AF movable part 11 becomes unstable, and therefore, second position detection magnet 15B is disposed to prevent such a situation.

AF fixing part 12 includes magnet holder 121, magnet part 122, and position detection part 16. Magnet part 122 is attached after AF movable part 11 is inserted to magnet holder 121.

Magnet holder 121 has a quadrangular cylindrical shape which is square in plan view. Four connection parts (four sides extending along the Z-axis direction) connecting the side walls of magnet holder 121 are recessed to radially inside in an arc-like shape. Suspension wire 30 is disposed at this portion (hereinafter referred to as "wire insertion part 121a"). With wire insertion part 121a, interference between suspension wire 30 and magnet holder 121 at the time when OIS movable part 10 sways is avoided.

Magnet holder 121 includes, at the upper portion, stopper parts 121b that protrude inward in the radial direction in a ring-shape. In stopper part 121b, the portion corresponding to upper spring fixing part 111e of lens holder 111 is cut out such that AF movable part 11 can move to the light reception side in the light axis direction relative to the top surface of magnet holder 121. When AF movable part 11 moves to the light reception side in the light axis direction, stopper part 121b makes contact with protruding parts 111d of lens holder 111, and thus the movement of AF movable part 11 to the light reception side in the light axis direction is restricted. In addition, arm parts 131c, 131f, 132c and 132f of upper elastic supporting part 13 are placed on the top surface of stopper part 121b.

Magnet holder 121 includes, at the four corners of bottom surface 121e, lower spring fixing parts (hereinafter referred to as "lower spring fixing parts 121e") that fix lower elastic supporting part 14. Magnet holder 121 includes, at the four corners of the upper portion, upper spring fixing parts 121c that fix upper elastic supporting part 13. The top surface of corner 121d of upper spring fixing part 121c is slightly recessed from the top surface (the surface on which upper elastic supporting part 13 is attached) of magnet holder 121 such that a gap is formed when upper elastic supporting part 13 is attached (hereinafter referred to as "damper installation part 121d"). A vertex part (the portion provided continuously with the upper portion of wire insertion part 121a) of damper installation part 121d protrudes outward relative to the lower portion, and is cut out in an arc-like shape. The cut-out portion having an arc-like shape of damper installation part 121d forms a part of wire insertion part 121a.

Magnet part 122 includes four cuboid permanent magnets 122A to 122D and coupling yoke 123. Permanent magnets 122A to 122D are disposed along the internal surfaces of the four side walls of magnet holder 121. Permanent magnets 122A to 122D are magnetized such that a traversing magnetic field in the radial direction is formed at AF coil part 112. For example, permanent magnets 122A to 122D are magnetized such that the inner periphery side and the outer periphery side thereof are set to N pole and S pole, respectively. Protruding part 111d of lens holder 111 is located in a space between magnet part 122 and stopper part 121b of magnet holder 121.

The AF voice coil motor is composed of magnet part 122 and AF coil part 112. In the present embodiment, magnet part 122 serves as the AF magnet part and as the OIS magnet part.

One of end surfaces of permanent magnet 122A in the longitudinal direction, and an end surface of adjacent permanent magnet 122B in the longitudinal direction are coupled with each other with coupling yoke 123. Coupling yoke 123 includes yoke part 123a at one end portion thereof, and yoke part 123b at the other end portion thereof. Specifically, yoke part 123a is disposed at an end surface of permanent magnet 122A in proximity to first position detection magnet 15A, and yoke part 123b is disposed at an end surface of permanent magnet 122B in proximity to first position detection magnet 15A.

Likewise, one of end surfaces of permanent magnet 122C in the longitudinal direction, and an end surface of adjacent permanent magnet 122D in the longitudinal direction are coupled with each other with coupling yoke 124. Yoke part 124a is disposed at an end surface of permanent magnet 122C in proximity to second position detection magnet 15B, and yoke part 124b is disposed at an end surface of permanent magnet 122D in proximity to second position detection magnet 15B.

Yoke parts 123a and 123b are used for suppressing intersection of the magnetic flux generated at magnet part 122 and the detection part of Hall device 161, that is, for reducing a leakage flux. By disposing yoke parts 123a and 123b, it is possible to reduce the output offset of Hall device 161, and set amplification gain to a high level, and thus, the detection sensitivity is improved. When yoke parts 123a and 123b are disposed, an attraction force is generated between first position detection magnet 15A and yoke parts 123a and 123b. Yoke parts 124a and 124b are disposed for balancing the magnetic force which acts on AF movable part 11, and for stabilizing the orientation of AF movable part 11.

While coupling yokes 123 and 124 are employed in the present embodiment, yoke parts 123a, 123b, 124a, and 124b may be independent members. It should be noted that, preferably, yoke parts 123a and 123b are coupled with each other as described in the present embodiment. With such a configuration, the ease of attaching operation is remarkably increased in comparison with the case where the yoke part is attached to each of permanent magnets 122A and 122B. In addition, an attraction force is generated also between first position detection magnet 15A and the coupling part that couples yoke part 123a and yoke part 123b, and therefore, by designing coupling yoke 123 such that an attraction force having a desired value is obtained, the thickness of yoke parts 123a and 123b can be reduced. Accordingly, the length of permanent magnets 122A and 122B can be increased, and therefore the driving performance of the AF driving part is improved. Furthermore, the above-mentioned configuration is useful for reinforcing the strength of AF fixing part 12.

Position detection part 16 is disposed at one of four upper spring fixing parts 121d of magnet holder 121. Position detection part 16 includes Hall device 161 that detects variation of the magnetic field by utilizing the Hall effect, and position detection substrate 162 for power feeding to Hall device 161 and extraction of the detection signal. Hall device 161 includes a detection part (not illustrated) composed of a semiconductor device, and is disposed such that the detection direction of the detection part coincides with the light axis direction. Position detection part 16 mainly detects the variation of the magnetic field of first position detection magnet 15A. With this configuration, the position of AF movable part 11 in the light axis direction is detected.

Upper elastic supporting part 13 is a leaf spring formed of beryllium copper, nickel copper, stainless-steel or the like, for example, and has a square shape as a whole in plan view. Upper elastic supporting part 13 includes upper leaf springs 131 and 132 that elastically support AF movable part 11 with respect to AF fixing part 12, power-source line parts 133 and 134 that feed power to Hall device 161, and signal line parts 135 and 136 that extract a detection signal from Hall device 161. Upper leaf springs 131 and 132, power-source line parts 133 and 134, and signal line parts 135 and 136 are shaped by etching.

Upper leaf spring 131 includes two spring parts 131A and 131B. Spring part 131A includes lens holder fixing part 131a that is fixed to lens holder 111, magnet holder fixing part 131b that is disposed at a position on the radially outside of lens holder fixing part 131a and is fixed to magnet holder 121, and arm part 131c that couples lens holder fixing part 131a and magnet holder fixing part 131b. Likewise, spring part 131B includes lens holder fixing part 131d, magnet holder fixing part 131e, and arm part 131f. Lens holder fixing parts 131a and 131d are coupled at a position on the inside of arm part 131c, and magnet holder fixing parts 131b and 131e are coupled at a position on the outside of arm parts 131c and 131f.

Lens holder fixing parts 131a and 131d have shapes corresponding to upper spring fixing parts 111e of lens holder 111. When the positioning bosses of lens holder 111 are fitted into the fixing holes of lens holder fixing parts 131a and 131d, upper leaf spring 131 is positioned and fixed to lens holder 111.

Magnet holder fixing parts 131b and 131e have shapes corresponding to upper spring fixing parts 121c of magnet holder 121. When the positioning bosses of lens holder 111 are fitted into the fixing holes of magnet holder fixing parts 131b and 131e, upper leaf spring 131 is positioned and fixed to magnet holder 121.

Arm parts 131c and 131f extend in the XY plane in a wave shape, and are elastically deformed when AF movable part 11 moves.

Upper leaf spring 131 includes wire connecting part 131g extending in a curved shape from magnet holder fixing part 131b. To wire connecting part 131g, suspension wire 33B for power feeding to AF coil part 112 (see FIG. 5) is connected. Upper leaf spring 131 includes coil connecting part 131h that has a U-shape in plan view and extends from lens holder fixing part 131d. Coil connecting part 131h is electrically connected by soldering to one end of AF coil part 112 tied to one tying part 111f of lens holder 111.

Although the shape of upper leaf spring 132 is not completely identical to that of upper leaf spring 131, their basic structures are similar to each other, and therefore, the description thereof is omitted. To wire connecting part 132g of upper leaf spring 132, suspension wire 33A for power feeding to AF coil part 112 (see FIG. 5) is connected. In addition, coil connecting part 132h is electrically connected by soldering to the other end of AF coil part 112 tied to the other tying part 111f of lens holder 111.

Power-source line part 133 includes, at the both end portions, fixing holes 133a and 133b corresponding to the positioning bosses of magnet holder 121. Power-source line part 133 includes, at one end portion, wire connecting part 133c extending in a curved shape. To wire connecting part 133c, suspension wire 32A (see FIG. 5) for power feeding to Hall device 161 is connected. The other end of power-source line part 133 is connected to the power source terminal of position detection substrate 162.

The shape of power-source line part 134 is symmetrical with power-source line part 133. To wire connecting part 134c of power-source line part 134, suspension wire 32B (see FIG. 5) for power feeding to Hall device 161 is connected. In addition, the other end of power-source line part 134 is connected to the power source terminal of position detection substrate 162.

Signal line part 135 includes fixing hole 135a corresponding to the positioning boss of magnet holder 121. Signal line part 135 includes, at one end portion, wire connecting part 135b extending in a curved shape. To wire connecting part 135b, suspension wire 31A for extraction of a detection signal from Hall device 161 (see FIG. 5) is connected. The other end of signal line part 135 is connected to the signal terminal of position detection substrate 162.

The shape of signal line part 136 is symmetrical with signal line part 135. To wire connecting part 136b of signal line part 136, suspension wire 31B (see FIG. 5) for extraction of a signal from Hall device 161 is connected. In addition, the other end of signal line part 136 is connected to the signal terminal of position detection substrate 162.

Wire connecting parts 131g, 132g, 133c, 134c, 135b and 136b are located on the light reception side in the light axis direction of wire insertion part 121a of magnet holder 121. In the state where upper elastic supporting part 13 is attached to magnet holder 121, a gap is formed between wire connecting parts 131g, 132g, 133c, 134c, 135b and 136b and damper installation part 121d (see FIG. 5). A damper is disposed in this gap. In addition, wire connecting parts 131g, 132g, 133c, 134c, 135b and 136b each have a shape which is easily elastically deformed. Deflection of wire connecting parts 131g, 132g, 133c, 134c, 135b and 136b and suspension wire 30 absorbs drop impact. Accordingly, plastic deformation and rupture of suspension wire 30 due to an impact of dropping or the like can be effectively prevented.

As with upper elastic supporting part 13, lower elastic supporting part 14 is a leaf spring made of beryllium copper, nickel copper, stainless-steel or the like (hereinafter referred to as "lower leaf spring 14"), and has a square shape as a whole in plan view. Lower leaf spring 14 elastically connects AF fixing part 12 (magnet holder 121) and AF movable part 11 (lens holder 111). Lower leaf spring 14 is shaped by etching.

Lower leaf spring 14 (lower elastic supporting member) includes four spring parts 141 to 144. Spring part 141 includes lens holder fixing part 141a that is fixed to lens holder 111, magnet holder fixing part 141b that is disposed at a position at 90 degrees from lens holder fixing part 141a and is fixed to magnet holder 121, and arm part 141c that couples lens holder fixing part 141a and magnet holder fixing part 141b. The configurations of spring parts 142 to 144 are similar to the above-mentioned configuration.

In lens holder fixing parts 141a to 144a, the lens holder fixing parts adjacent to each other are coupled with coupling part 145 to have a shape corresponding to lower spring fixing part 111g of lens holder 111. When the positioning bosses of lower spring fixing part 111g of lens holder 111 are fitted into the fixing holes of lens holder fixing parts 141a to 144a, lower leaf spring 14 is positioned and fixed to lens holder 111.

Magnet holder fixing parts 141b to 144b have shapes corresponding to lower spring fixing parts 121e of magnet holder 121. When the positioning bosses of lower spring fixing parts 121e are fitted into the fixing holes of magnet holder fixing parts 141b to 144b, lower leaf spring 14 is positioned and fixed to magnet holder 121.

At the time of assembling OIS movable part 10, first, position detection part 16 (Hall device 161 and position detection substrate 162) is attached to magnet holder 121, and coupling yokes 123 and 124 are attached to the yoke housing part (not illustrated) of magnet holder 121. Then, upper elastic supporting part 13 is attached to upper spring fixing part 121c.

At this time, one ends of power-source line parts 133 and 134 are soldered and electrically connected to the power source terminal of position detection substrate 162. In addition, one ends of signal line parts 135 and 136 are soldered and electrically connected to the signal terminal of position detection substrate 162.

Next, lower leaf spring 14 is attached to lower spring fixing parts 111g of lens holder 111, and in this state, lens holder 111 is fitted into magnet holder 121 from the imaging side in the light axis direction. Then, upper leaf springs 131 and 132 are attached to upper spring fixing parts 111e of lens holder 111. In addition, lower leaf spring 14 is attached to a lower spring fixing part (not illustrated) of magnet holder 121.

At this time, coil connecting part 131h of upper leaf spring 131 is soldered and electrically connected one end of AF coil part 112 tied to one tying part 111f of lens holder 111. Likewise, tying connection part 132h of upper leaf spring 132 is soldered and electrically connected to the other end of AF coil part 112 tied to the other tying part 111f of lens holder 111.

Next, permanent magnets 122A to 122D are inserted to magnet holder 121 from the imaging side in the light axis direction, and bonded thereto. At the same time, yoke part 123a of coupling yoke 123 is bonded to an end surface of permanent magnet 122A in the longitudinal direction, and yoke part 123b of coupling yoke 123 is bonded to an end surface of permanent magnet 122B in the longitudinal direction. In addition, yoke part 124a of coupling yoke 124 is bonded to an end surface of permanent magnet 122C in the longitudinal direction, and yoke part 124b of coupling yoke 124 is bonded to an end surface of permanent magnet 122D in the longitudinal direction. In this manner, OIS movable part 10 (AF driving part) is assembled.

As described above, lens driving device 1 includes an AF driving part (OIS movable part 10) including AF coil part 112 disposed at a periphery of a lens part, and AF magnet part 122 disposed separately from AF coil part 112 in a radial direction, the AF driving part being configured to perform automatic focusing by moving, with respect to an auto focus fixing part including AF magnet part 122, an auto focus movable part including AF coil part 112 in a light axis direction by use of a driving force of a voice coil motor composed of AF coil part 112 and AF magnet part 122.

Figure 7:
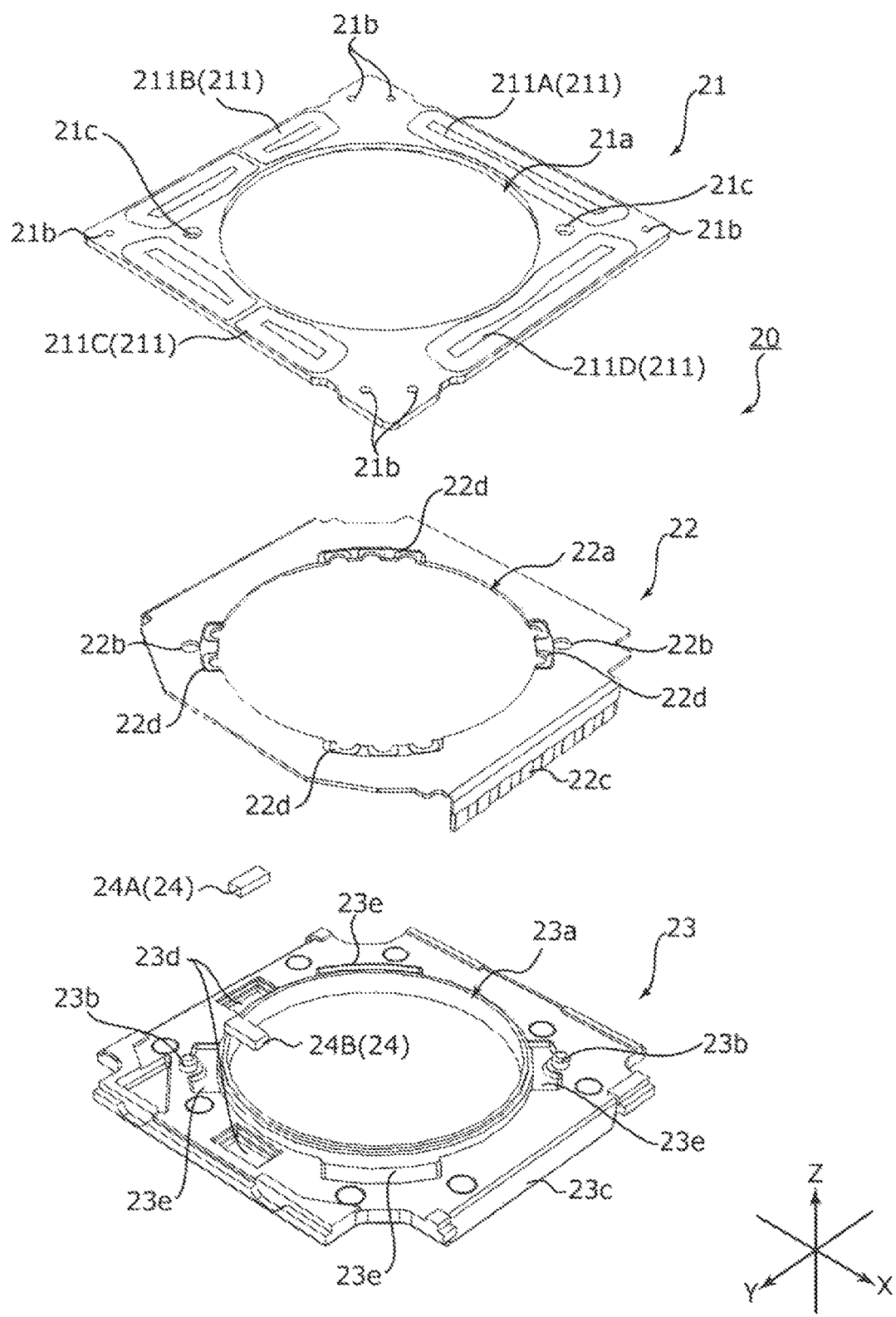
FIG. 7 is an exploded perspective view of the OIS fixing part.

FIG. 7 is an exploded perspective view of OIS fixing part 20. As illustrated in FIG. 7, OIS fixing part 20 includes coil substrate 21, connection substrate 22, base member 23, position detection part 24 and the like.

In plan view, coil substrate 21 has a square shape, and has circular opening 21a at a center portion. Coil substrate 21 includes, at the four corners, wire fixing holes 21b through which the other end (lower end) of suspension wire 30 is inserted. In addition, coil substrate 21 includes positioning holes 21c at positions which intersect the diagonal direction of peripheral portions of opening 21a.

Coil substrate 21 includes OIS coil part 211 at a position opposite to magnet part 122 in the light axis direction. OIS coil part 211 includes four OIS coils 211A to 211D corresponding to permanent magnets 122A to 122D. The sizes and positions of OIS coils 211A to 211D and permanent magnets 122A to 122D are set such that the magnetic field radiated from the bottom surfaces of permanent magnets 122A to 122D traverses the long side portions of OIS coils 211A to 211D in the Z direction. The OIS voice coil motor is composed of magnet part 122 and OIS coil part 211.

As with coil substrate 21, connection substrate 22 has a square shape in plan view, and has circular opening 22a at a center portion. Connection substrate 22 includes, at peripheral portions of opening 22a, positioning holes 22b at positions corresponding to positioning holes 21c of coil substrate 21. Connection substrate 22 includes, at the two sides along the Y direction, control terminals 22c that are bent downward.

Connection substrate 22 includes power source terminal 22d for power feeding to OIS coil part 211 at four portions of the inner peripheral edge of opening 22a which intersect the diagonal direction. In addition, connection substrate 22 includes a power-source line (not illustrated) for power feeding to AF coil part 112 and OIS coil part 211, and a signal line (not illustrated) for a detection signal output from position detection part 24. Position detection part 24 that detects the position of OIS movable part 10 in the XY plane is disposed on the rear surface of connection substrate 22.

Position detection part 24 is composed of Hall devices 24A and 24B (magnetic sensors) that detect the magnetic field by utilizing Hall effect, for example. Hall devices 24A and 24B are respectively disposed at approximate centers at adjacent two sides of the bottom surface of connection substrate 22. By detecting the magnetic field formed by magnet part 122 with Hall devices 24A and 24B, the position of OIS movable part 10 in the XY plane can be specified. It is to be noted that a magnet for position detection may be disposed independently of magnet part 122 in OIS movable part 10.

As with coil substrate 21, base member 23 has a square shape in plan view, and has circular opening 23a at a center portion. Base member 23 includes, at peripheral portions of opening 23a, positioning bosses 23b at positions corresponding to positioning holes 21c of coil substrate 21 and positioning holes 22b of connection substrate 22.

Base member 23 includes recess 23c at a position corresponding to control terminal 22c of connection substrate 22 at a peripheral portion. Recess 23c is formed in a tapered shape expanding outward toward the lower side. In addition, base member 23 includes, at peripheral portions of opening 23a, Hall device housing parts 23d that house Hall devices 24A and 24B, and terminal housing parts 23e that house power source terminals 22d of connection substrate 22.

At the time of assembling OIS fixing part 20, first, coil substrate 21 and connection substrate 22 are bonded by soldering. In this manner, the power-source line (not illustrated) of connection substrate 22 and OIS coil part 211 are electrically connected to each other.

Next, positioning holes 21c of coil substrate 21 and positioning holes 22b of connection substrate 22 are fitted to positioning bosses 23b of base member 23 to dispose coil substrate 21 and connection substrate 22 on base member 23. When control terminal 22c of connection substrate 22 is engaged with recess 23c of base member 23, coil substrate 21 and connection substrate 22 are fixed to base member 23. In this manner, OIS fixing part 20 is assembled.

As described above, lens driving device 1 includes an OIS driving part including magnet part 122 disposed in the AF driving part, and OIS coil part 211 disposed separately from magnet part 122 in the light axis direction, the OIS driving part being configured to perform shake correction by swaying, with respect to OIS fixing part 20 including OIS coil part 211, movable part 10 including magnet part 122 in a plane orthogonal to the light axis direction by use of a driving force of a voice coil motor composed of OIS coil part 211 and magnet part 122.

At the time of assembling lens driving device 1, one ends of suspension wires 33A and 33B are respectively inserted to wire connecting part 132g of upper leaf spring 132 and wire connecting part 131g of upper leaf spring 131, and fixed thereto by soldering. One ends of suspension wires 32A and 32B are respectively inserted to wire connecting part 133c of power-source line part 133 and wire connecting part 134c of power-source line part 134 and fixed thereto by soldering. One ends of suspension wires 31A and 31B are respectively inserted to wire connecting part 135*b* of signal line part 135 and wire connecting part 136*b* of signal line part 136, and fixed thereto by soldering. In this manner, suspension wire 30, and upper leaf springs 131 and 132, power-source line parts 133 and 134, and signal line parts 135 and 136 are electrically connected together.

Next, the other end (lower end) of suspension wire 30 is inserted to wire fixing hole 21*b* of coil substrate 21, and is fixed by soldering. In this manner, the power-source line and the signal line of connection substrate 22 and suspension wire 30 are electrically connected to each other. That is, it is possible to perform power feeding to AF coil part 112 and Hall device 161 and operation control of Hall device 161 through suspension wire 30 and upper elastic supporting part 13.

In addition, a damper (not illustrated) is disposed at damper installation part 121*d* (including upper portion of wire insertion part 121*a*) of magnet holder 121 in such a manner as to surround suspension wire 30. Thus the damper is interposed between magnet holder 121 and upper leaf springs 131 and 132. By interposing the damper (not illustrated) between magnet holder 121 and upper leaf springs 131 and 132, generation of unnecessary resonance (high-order resonance mode) can be reduced, and consequently, the stability of the operation can be ensured. The damper can be readily applied to damper installation part 121*d* by use of a dispenser. For example, ultraviolet curing silicone gel can be adopted as the damper.

Shield cover 2 is attached to lens driving device 1 such that a lower end portion of shield cover 2 makes contact with a ground terminal (not illustrated) of connection substrate 22. Since shield cover 2 is grounded through the ground terminal (not illustrated), EMC noise cab be blocked.

At the time of shake correction in lens driving device 1, OIS coil part 211 is energized. When OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and to the direction of the current flowing through the long side portion of OIS coil part 211 (the X direction or the Y direction). Since OIS coil part 211 is fixed, a reactive force acts on magnet part 122. With this reactive force serving as the driving force of the OIS voice coil motor, OIS movable part 10 including magnet part 122 sways in the XY plane, and thus shake correction is performed.

At the time of automatic focusing in lens driving device 1, AF coil part 112 is energized. When AF coil part 112 is energized, a Lorentz force is generated at AF coil part 112 by interaction between the magnetic field of magnet part 122 and the current flowing through AF coil part 112. The direction of the Lorentz force is the direction (the Z direction) orthogonal to the direction of the magnetic field (X direction or Y direction) and the direction of the current flowing through the AF coil part 211 (the Y direction or the X direction). Since magnet part 122 is fixed, a reactive force acts on AF coil part 112. With this reactive force serving as the driving force of the AF voice coil motor, AF movable part 11 including AF coil part 112 moves in the light axis direction, and thus focusing is performed.

Here, in an non-energization state where focusing is not performed, AF movable part 11 is suspended between the infinity position and the macro position with upper leaf springs 131 and 132 and lower leaf spring 14 (hereinafter referred to as "reference state"). That is, in OIS movable part 10, AF movable part 11 (lens holder 111) is elastically supported such that AF movable part 11 is displaceable in the Z direction in the state where the position of AF movable part 11 with respect to AF fixing part 12 (magnet holder 121) is set by upper leaf springs 131 and 132, and lower leaf spring 14.

At the time of focusing, the direction of the current is controlled based on whether AF movable part 11 is moved from the reference state toward the macro position side or toward the infinity position side. In addition, the value of the current is controlled based on the movement length of AF movable part 11.

When AF movable part 11 moves to the infinity position side at the time of focusing, the bottom surface of protruding part 111*d* of lens 111 holder approaches the top surface of magnet part 122, and finally makes contact with the top surface of magnet part 122. That is, the movement to the infinity position side is restricted by the bottom surface of protruding part 111*d* of lens holder 111 and the top surface of magnet part 122. When AF movable part 11 moves to the macro position side at the time of focusing, the top surface of protruding part 111*d* of lens holder 111 approaches the bottom surface of stopper part 121*b* of magnet holder 121, and finally makes contact with the bottom surface of stopper part 121*b*. That is, the movement to the macro position side is restricted by the top surface of protruding part 111*d* of lens holder 111 and the bottom surface of stopper part 121*b* of magnet holder 121.

Further, in the AF driving part of lens driving device 1, a closed loop control is performed based on a detection signal of position detection part 16. With the closed loop control method, the hysteresis characteristics of the voice coil motor are not required to be considered, and the stability of the position of AF movable part 11 can be directly detected. Furthermore, automatic focusing of an image surface detection method can be adopted. Accordingly, with high responsiveness, speedup of the automatic focusing operation can be achieved.

Figure 9A:
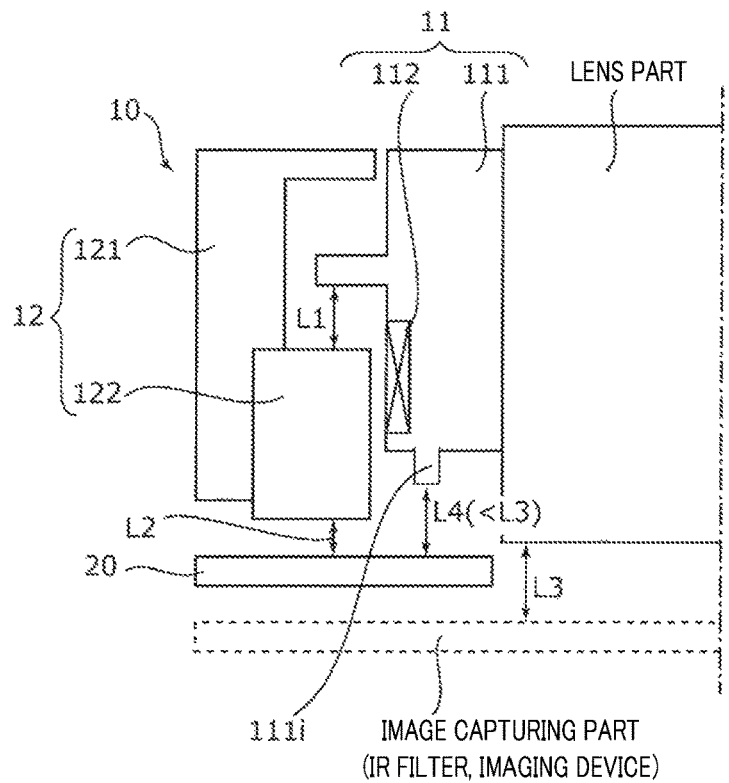
FIGS. 9A and 9B illustrate a displacement width of the lens part in the lens driving device according to the embodiment.
Figure 9B:
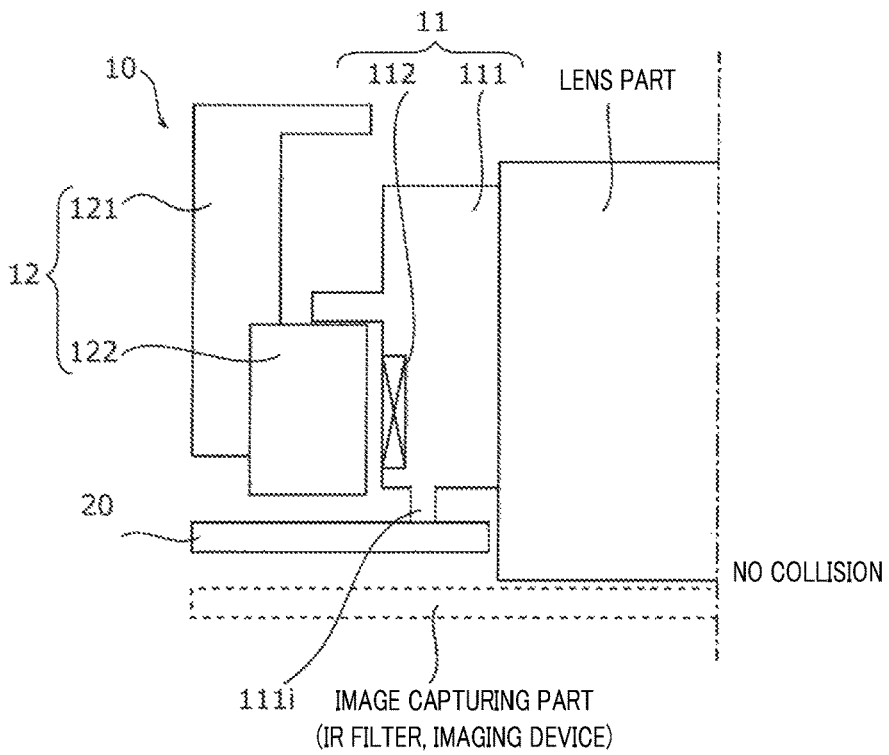

FIGS. 9A and 9B illustrate a displacement width of a lens part in lens driving device 1. FIG. 9A illustrates a neutral (non-energization) state, and FIG. 9B illustrates a state at the time of dropping. As illustrated in FIGS. 9A and 9B, AF movable part 11 can move by L1 (hereinafter referred to as "lower movable range L1") to the imaging side in the light axis direction. In addition, OIS movable part 10 is separated from OIS fixing part 20 by L2 (hereinafter referred to as "magnet gap L2") for the purpose of swaying in a plane orthogonal to the light axis direction. Lower movable range L1 of AF movable part 11 and magnet gap L2 are designed such that the performance required for lens driving device 1 can be achieved. In addition, distance L4 between OIS fixing part 20 and sub stopper part 111*i* of lens holder 111 is set to a value smaller than distance L3 (substantially identical to the acceptable displacement range of the lens part) between the lens part and the image capturing part.

The movable distance of AF movable part 11 to the imaging side in the light axis direction is "lower movable range L1+magnet gap L2" in the case where lens holder 111 has no sub stopper part 111*i*, and is L4 (<L1+L2) in the case where sub stopper part 111*i* is provided. Accordingly, when an impact of dropping or the like is applied to the lens part, the lens part is displaced to the imaging side in the light axis direction by up to movable distance L4 of AF movable part 11. Since distance L3 between the lens part and the image capturing part is greater than maximum displacement L4 of the lens part, collision with the image capturing part is not caused even when the lens part is displaced to the imaging side in the light axis direction with an impact of dropping or the like. Accordingly, damaging of the IR filter due to collision with the lens part can be prevented.

For example, in the case where the attaching tolerance is ±65 μm, when distance L4 between sub stopper part 111i and OIS fixing part 20 is set to 195 μm, the movable distance of AF movable part 11 is 130≤L4≤260. Accordingly, it is also possible to meet a demand that lower movable range L1 of AF movable part 11 is 85 μm or greater, and that the acceptable displacement range of the lens part is 265 μm or smaller. That is, with sub stopper part 111i, it is possible to easily set the size which meets the demand including the attaching tolerance.

As described above, lens driving device 1 includes sub stopper part 111i that is interposed between OIS movable part 10 (lens holder 111) and OIS fixing part 20, and is configured to limit the movable distance of AF movable part 11 to the imaging side in the light axis direction to a value within the acceptable displacement range of the lens part.

With this configuration, it is possible to set the displacement of the lens part to a value within the acceptable displacement range without preventing height reduction. Accordingly, the reliability of lens driving device 1 is remarkably improved.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while lens holder 111 is provided with sub stopper part 111i in the embodiment, a sub stopper part may be provided on OIS fixing part 20 side.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (for example, a rear-view monitor apparatus or a drive recorder apparatus). In addition, the camera mounting device serving as a transport apparatus is a transport apparatus including a camera module and a control section that processes an image obtained with the camera module, such as an automobile.

Figure 10A:
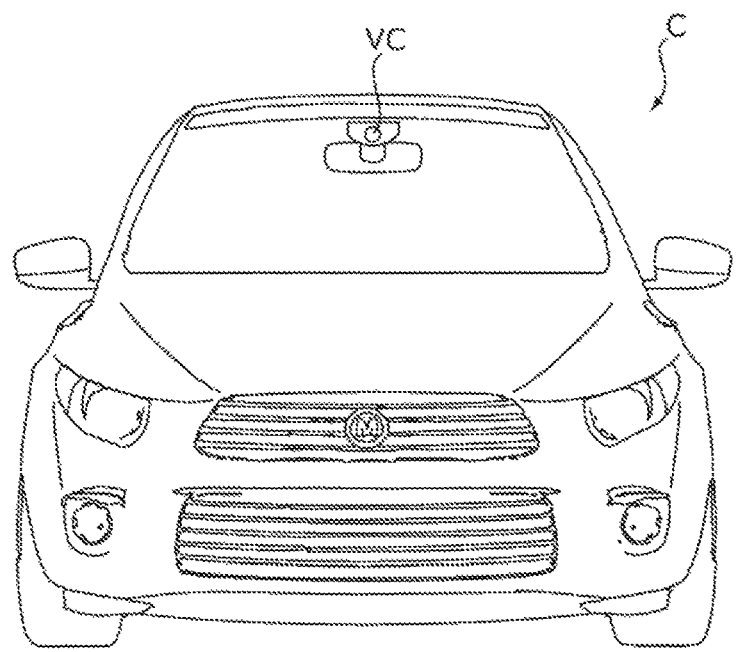
FIGS. 10A and 10B illustrate an automobile serving as a camera mounting device in which an in-vehicle camera module is mounted.
Figure 10B:
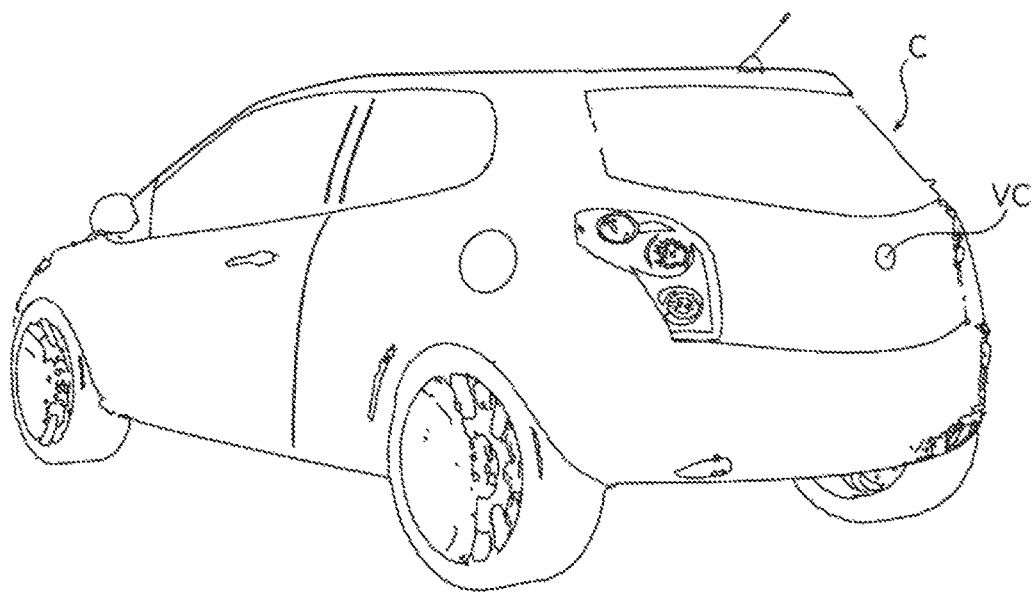

FIGS. 10A and 10B illustrate automobile C serving as a camera mounting device in which an in-vehicle camera module vehicle camera (VC) is mounted. FIG. 10A is a front view of automobile C, and FIG. 10B is a rear perspective view of automobile C. In automobile C, camera module A described in the embodiment is mounted as in-vehicle camera module VC. As illustrated in FIGS. 10A and 10B, in-vehicle camera module VC is attached to the windshield so as to face the front side, for example, or attached to the rear gate so as to face the rear side. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2014-265987 dated Dec. 26, 2014, the disclosure of which including the specification, drawings and abstract is incorporated herein by reference in its entirety.

REFERENCE SIGNS LIST

1 Lens driving device
2 Shield cover
10 OIS movable part (AF driving part)
11 AF movable part
111 Lens holder
111i Sub stopper part
112 AF coil part
12 AF fixing part
121 Magnet holder
122 Magnet part (AF magnet part, OIS magnet part)
122A to 122D Permanent magnet
13 Upper elastic supporting part
14 Lower elastic supporting part
15 position detection magnet
16 position detection part
20 OIS fixing part
21 Coil substrate
211 OIS coil part
22 Connection substrate
23 Base member
30 Supporting member
M Smartphone
A Camera module

The invention claimed is:
1. A lens driving device comprising:
an auto-focusing driving part including an auto-focusing coil part disposed at a periphery of a lens part, and an auto-focusing magnet part disposed separately from the auto-focusing coil part in a radial direction, the auto-focusing driving part being configured to:
perform automatic focusing by moving, with respect to an auto focus fixing part including the auto-focusing magnet part, an auto focus movable part including the auto-focusing coil part in a light axis direction by use of a driving force of a voice coil motor composed of the auto-focusing coil part and the auto-focusing magnet part;
a shake-correcting driving part including a shake-correcting magnet part disposed in the auto-focusing driving part, and a shake-correcting coil part disposed separately from the shake-correcting magnet part in the light axis direction, the shake-correcting driving part being configured to:
perform shake correction by swaying, with respect to a shake correction fixing part including the shake-correcting coil part, a shake correction movable part including the shake-correcting magnet part in a plane orthogonal to the light axis direction by use of a driving force of a voice coil motor composed of the shake-correcting coil part and the shake-correcting magnet part;

a stopper part configured to:
    limit movement of the auto focus movable part to an imaging side in the light axis direction against the auto focus fixing part; and
a sub stopper part interposed between the auto focus movable part and the shake correction fixing part, and configured to:
    limit movement of the auto focus movable part to the imaging side in the light axis direction against the shake correction fixing part, wherein:
    the sub stopper part is provided at one of the auto-focusing movable part and the shake correction fixing part, and
    a first distance is set to a value smaller than a second distance and greater than a third distance, wherein
        the first distance is a distance between the one of the auto-focusing movable part and the shake correction fixing part and the other,
        the second distance is a distance between the lens part and an imaging device configured to capture a subject image imaged with the lens part, and
        the third distance is a distance limited by the stopper part.

2. The lens driving device according to claim 1, wherein:
the auto-focusing driving part includes an elastic supporting part configured to elastically connect the auto focus movable part and the auto focus fixing part; and
the auto focus movable part is supported by the elastic supporting part such that the auto focus movable part is movable to both sides in the light axis direction.

3. The lens driving device according to claim 1, wherein:
the auto focus movable part includes a lens holder configured to hold the lens part, wherein the auto-focusing coil part is wound around an outer peripheral surface of the lens holder; and
the sub stopper part is a plurality of protruding parts that are formed in the lens holder to protrude toward the imaging side in the light axis direction.

4. The lens driving device according to claim 3, wherein the protruding parts are evenly disposed around the light axis direction.

5. A camera module comprising:
the lens driving device according to claim 1;
a lens part mounted in the auto focus movable part; and
an image capturing part configured to capture a subject image imaged with the lens part.

6. A camera mounting device that is an information apparatus or a transport apparatus, the camera mounting device comprising the camera module according to claim 5.

7. The lens driving device according to claim 1, wherein the second distance is set to a value smaller than a movable distance of the auto focus movable part, the movable distance being set if the sub stopper part is not provided.

* * * * *